(12) United States Patent
Baccouche et al.

(10) Patent No.: US 7,255,378 B1
(45) Date of Patent: Aug. 14, 2007

(54) BUMPER FOR AUTOMOTIVE VEHICLE

(75) Inventors: Ridha Baccouche, Ann Arbor, MI (US); Chelliah Madasamy, Canton, MI (US); David Wagner, Northville, MI (US); Hikmat Mahmood, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/163,524

(22) Filed: Oct. 21, 2005

(51) Int. Cl.
*B60R 19/36* (2006.01)
(52) U.S. Cl. .................. 293/146; 293/102; 293/132
(58) Field of Classification Search ............... 293/102, 293/132, 133, 142, 146, 147, 148, 155
See application file for complete search history.

(56) References Cited

U.S. PATENT DOCUMENTS

| | | | |
|---|---|---|---|
| 3,861,110 A * | 1/1975 | Bartlett .................. 52/718.05 |
| 5,340,178 A | 8/1994 | Stewart et al. | |
| 5,441,319 A * | 8/1995 | Oyama et al. ............... 293/155 |
| 5,785,367 A | 7/1998 | Baumann et al. | |
| 6,000,738 A * | 12/1999 | Stewart et al. ............... 293/102 |
| 6,481,690 B2 | 11/2002 | Kariatswumari et al. | |
| 6,712,411 B2 | 3/2004 | Gotanda et al. | |
| 6,764,119 B2 * | 7/2004 | Bladow et al. .............. 293/155 |
| 6,971,690 B2 * | 12/2005 | Evans et al. ................. 293/102 |
| 2005/0057053 A1 * | 3/2005 | Evans et al. ................. 293/133 |
| 2005/0285417 A1 * | 12/2005 | Heatherington et al. .... 293/102 |

* cited by examiner

*Primary Examiner*—Lori L. Lyjak
(74) *Attorney, Agent, or Firm*—Gigette M. Bejin; Artz & Artz, P.C.

(57) ABSTRACT

A bumper system for an automotive vehicle includes a unitary bumper beam substrate which defines upper and lower channel sections which are capped for part of their length by stiffening elements which provide localized increased strength and resistance to elastic buckling and collapsing of the bumper beam.

19 Claims, 3 Drawing Sheets

BUMPER FOR AUTOMOTIVE VEHICLE

TECHNICAL FIELD

This invention relates to an automotive bumper having a beam substrate which is locally strengthened to achieve performance characteristics appropriate for the bumpers of automotive vehicles, with reduced weight and cost.

BACKGROUND

Automotive bumpers must have the capability to manage impact energy without suffering excessive damage. To meet this requirement, most bumper beams have an invariant sectional configuration characterized by longitudinally invariant strength not only in bending, but also in compression and in resistance to buckling. Each of these characteristics must be sufficient to protect a vehicle against excessive damage. However, a bumper having an invariant cross section exhibiting the same bulk operational characteristics as the present inventive bumper, will weigh, and likely cost, more than the present bumper because the impact reaction of a bumper, in compression, for example, occurs primarily through the frame horns. As a result, much of the strength characterizing the entire length of a conventional, longitudinally invariant, bumper is not needed, and cannot be utilized. As a result, the unusable structure is in essence, wasted.

The present inventive bumper uses a localized, structurally modified beam substrate to react against impact loading, especially those reacted through the frame horns of a vehicle, while at the same time providing savings in material, weight, and cost.

SUMMARY

A bumper for an automotive vehicle includes a unitary beam substrate defining a plurality of channels. A plurality of stiffening caps is applied to the plurality of channels, so as to form a plurality of box sections. The present bumper preferably extends laterally across a vehicle. The stiffening caps do not extend across the entire bumper, however, but rather are applied only to portions of the beam substrate extending inboard from either end of the beam. In addition to the stiffening caps applied to the outboard sections of the beam substrate, a center stiffening cap is applied to a midpoint or middle section or center section of the beam substrate.

The stiffening caps applied to the outboard sections and, for that matter, the midpoint of the beam substrate, are unitary and are formed as segments joined by longitudinally extending stiffening beads.

According to another aspect of the present invention, a beam substrate used in the present bumper includes a generally vertical front face, an upwardly opening channel section cantilevered from an upper portion of the front face, and a downwardly opening channel section cantilevered from a lower portion of the front face. The beam substrate also includes an upper mounting flange extending downwardly from the upper channel section, and a lower mounting flange extending upwardly from the lower channel section. These mounting flanges are used to make a connection with mounting plates which attach the bumper to left and right frame horns of the vehicle.

It is an advantage of the present bumper system that superior strength and dynamic performance during impact are achieved with a bumper having lower weight and cost than other prior art bumpers.

It is a further advantage of the present invention that the bumper system may be built around a roll formed or extruded beam substrate providing excellent strength, but at lower manufacturing cost, as compared with prior art bumpers.

It is a further advantage of the present invention that the performance characteristics of the present bumper may be tuned more readily than is the case with prior art bumpers, because of the ability to change the operating characteristics of the upper and lower stiffening caps applied to the outboard portions of the beam substrate.

It is a further advantage of a bumper system according to the present invention that a multiple box beam structure may be created locally, so as to give localized higher performance sections of the resultant bumper beam without the need for maintaining a higher performance section, and concomitant weight and cost, across the entire width of the bumper.

Other advantages, as well as objects and features of the present invention will become apparent to the reader of this specification.

DETAILED DESCRIPTION OF THE PREFERRED EMBODIMENTS

Figure 1:
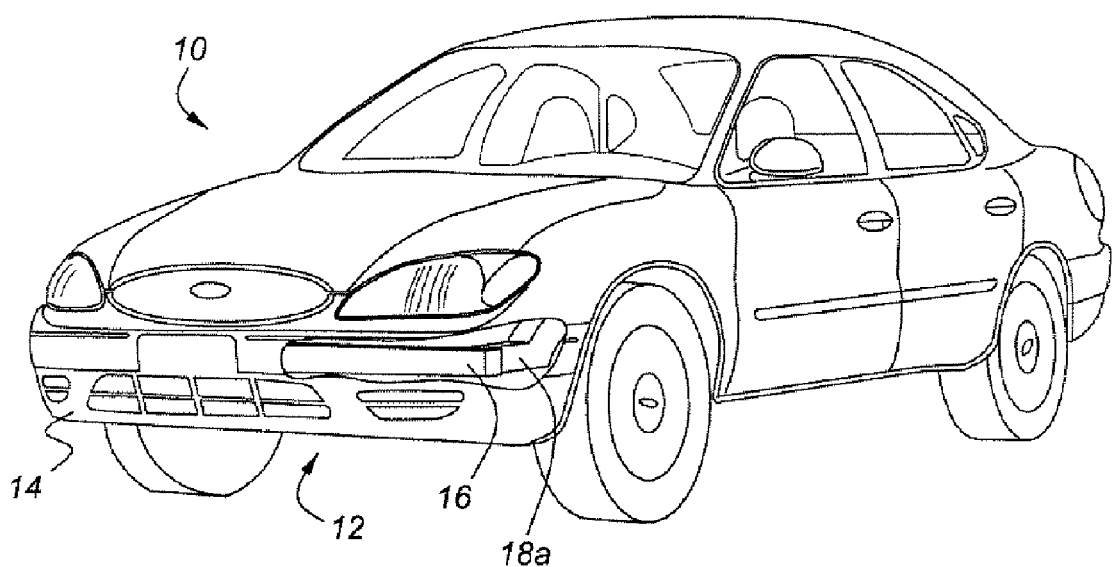
FIG. 1 is a perspective view of an automotive vehicle having a bumper system according to the present invention.

As shown in FIG. 1, vehicle 10 has bumper 12 with bumper cover 14 providing a finish for the bumper. Bumper cover 14 is applied to bumper beam substrate 16, which is shown in FIG. 1 as being attached to left frame horn 18a, it being understood that bumper beam substrate 16 will also be attached to right frame horn 18b (FIG. 2).

Figure 2:
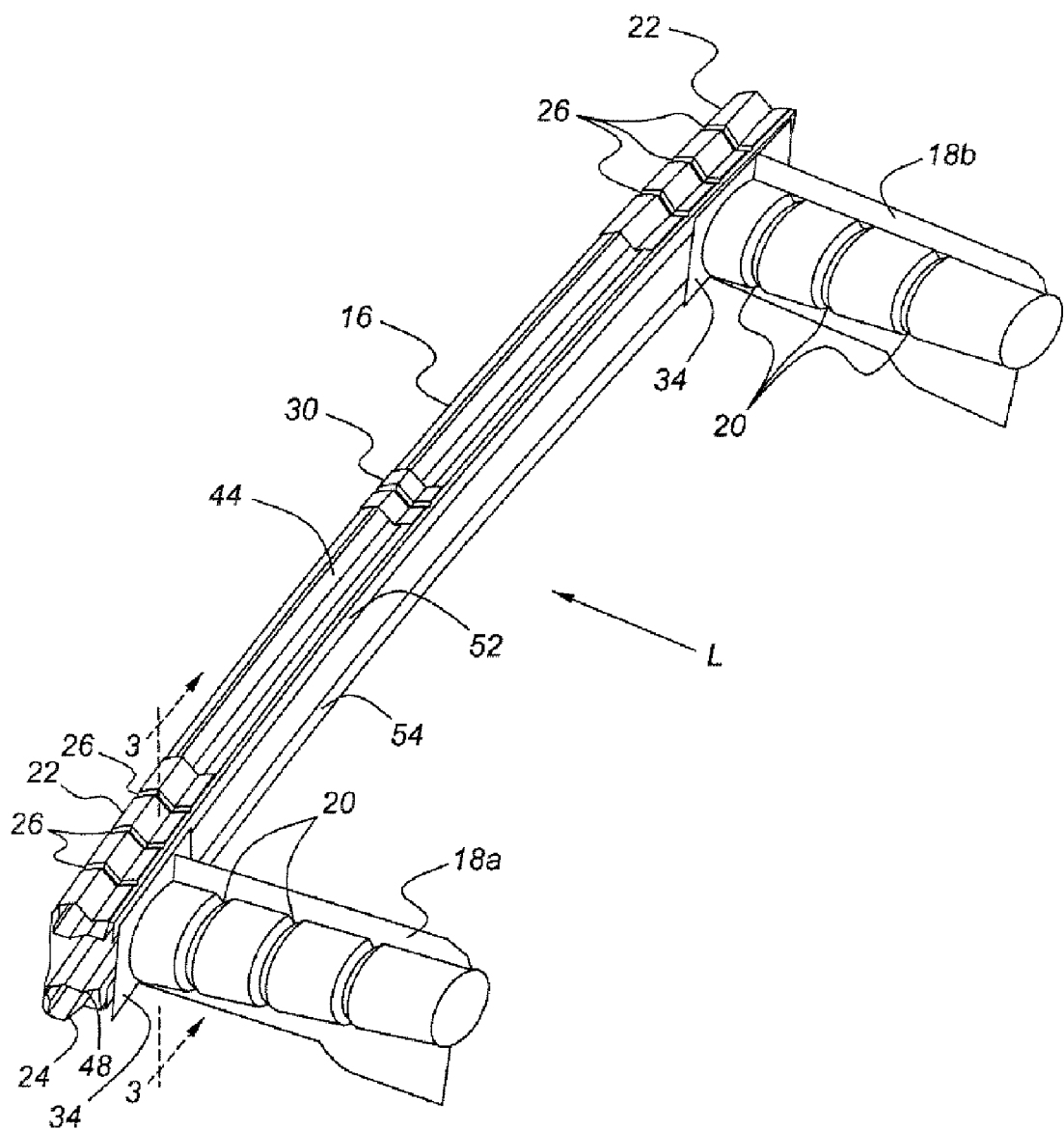
FIG. 2 is a perspective view of the inventive bumper system according to the present invention.
Figure 3:
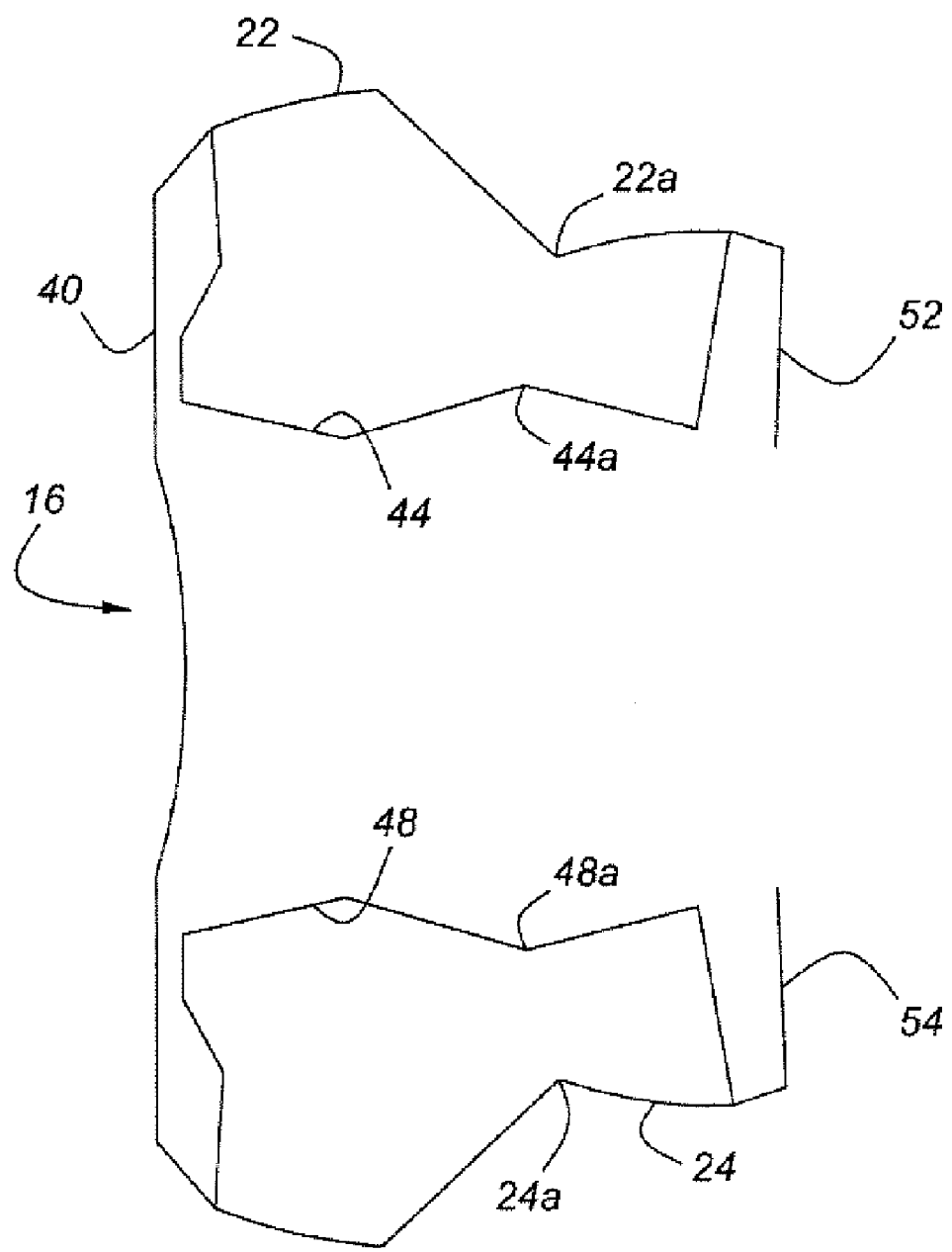
FIG. 3 is a sectional view of a beam substrate and stiffening caps, taken along the line 3-3 of FIG. 2.

FIG. 3 is a sectional view of a capped portion of the bumper beam, including substrate 16, upper stiffening end cap 22, and lower stiffening end cap 24. Upper cap 22 is applied to a portion of upwardly opening channel section 44, and lower cap 24 is applied to downwardly opening channel section 48. Upwardly opening channel section 44 and downwardly opening channel section 48 are cantilevered from generally vertical front face 40. Center stiffening cap 30 is shown in FIG. 2.

FIG. 2 illustrates that stiffening caps 22 and 24 are applied to beam substrate 16 across only portions of substrate 16 extending inboard from the ends of substrate 16 to positions which are slightly inboard from frame horns 18a and 18b. This means that the total weight of caps 22 and 24, and bumper 12, will be much less than would be the case were caps 22 and 24 to be applied to the entire longitudinal length of substrate 16. FIG. 2 shows further that frame horns 18a and 18b are equipped with crush zones 20, which assist in managing longitudinally directed impact loads.

Center cap 30 is placed near the midpoint of bumper beam substrate 16, so as to provide increased torsional, bending, and warping stiffness for bumper 12. Upper stiffening end caps 22 and lower caps 24 include longitudinal beads 26 (FIG. 2 see longitudinal direction, "L"), which cause a delay in the elastic buckling of bumper 12 and increase the resistance of beam substrate 16 to axial collapse. In essence, end caps 22 and 24 transform upwardly opening channel section 44, and downwardly opening channel section 48 into box section beams extending generally horizontally across a portion of vehicle 10. A similar transformation occurs with respect to mounting plates 34, which are shown in FIG. 2 as being attached to upper mounting flange 52 and lower mounting flange 54. Mounting plates 34 produce a large box beam by enclosing a segment of the rear portion of beam substrate 16.

Controlled axial collapse of bumper 12 is achieved in part through the use of internal collapse zones which are indicated at 22a and 44a at the upper portion of beam 16, with 24a and 48a defining a collapse zone at the lower portion of beam 16. The impact performance of bumper 12 may be tuned or adjusted by changing the strength of end caps 22 and 24, without the need for revision of beam 16.

While particular embodiments of the invention have been shown and described, numerous variations and alternate embodiments will occur to those skilled in the art. Accordingly, it is intended that the invention be limited only in terms of the appended claims.

What is claimed is:

1. A bumper for an automotive vehicle, comprising:
   a unitary beam substrate defining a plurality of channels; and
   a plurality of stiffening caps applied to said plurality of channels, so as to form a plurality of box sections, wherein said stiffening caps have longitudinally extending stiffening beads formed therein.

2. A bumper according to claim 1, wherein said bumper extends laterally across said automotive vehicle.

3. A bumper according to claim 1, wherein said beam substrate has a first end, a second end, and a midpoint, with said stiffening caps being applied to a first portion of the beam substrate extending inboard from the first end, and to a second portion of the beam substrate extending inboard from the second end.

4. A bumper according to claim 3, further comprising at least one stiffening cap applied at the midpoint of said beam substrate.

5. A bumper according to claim 1, wherein said channels extend generally horizontally.

6. A bumper according to claim 1, wherein said unitary beam substrate comprises a generally vertically extending front face having cantilevered upper and lower channel sections.

7. A bumper according to claim 1, wherein each of said plurality of channels and said plurality of stiffening caps is formed with an internal collapse zone.

8. A bumper according to claim 1, further comprising a bumper cover attached to said beam substrate.

9. A bumper for an automotive vehicle, comprising:
   a unitary beam substrate comprising:
      a generally vertical front face;
      an upwardly opening channel section cantilevered from an upper portion of said front face;
      a downwardly opening channel section cantilevered from a lower portion of said front face; and
   a plurality of stiffening caps, with at least one of said caps being applied to an outboard portion of each of said channel sections, so as to form a plurality of generally horizontal box sections.

10. A bumper according to claim 9, further comprising at least one stiffening cap applied to the midpoint of said beam substrate.

11. A bumper according to claim 9, wherein said beam substrate further comprises an upper mounting flange extending downwardly from said upper channel section and a lower mounting flange extending upwardly from said lower channel section.

12. A bumper according to claim 11, further comprising a plurality of mounting plates applied to and extending between said upper mounting flange and said lower mounting flange.

13. A bumper according to claim 12, further comprising a plurality of frame horns, with at least one of said frame horns being attached to each of said mounting plates.

14. A bumper according to claim 9, further comprising a bumper cover attached to said beam substrate.

15. A bumper according to claim 9, wherein said beam substrate is roll formed.

16. A bumper system for an automotive vehicle, comprising:
   a plurality of longitudinally extending frame horns;
   a unitary bumper beam substrate attached to and extending laterally across said frame horns, with said substrate having upper and lower channel sections;
   a plurality of upper stiffening caps applied to outboard portions of said upper channel section;
   a plurality of lower stiffening caps applied to outboard portions of said lower channel section;
   a center stiffening cap applied to a central portion of said beam substrate; and
   a bumper cover applied to said beam substrate.

17. A bumper system according to claim 16, wherein said upper and lower stiffening caps are unitary and formed as segments joined by longitudinally extending stiffening beads.

18. A bumper system according to claim 16, wherein said beam substrate is extruded.

19. A bumper system according to claim 16, wherein said outboard portions of said upper channel section and said outboard portions of said lower channel section extend inboard to positions which are proximate the inboard portions of frame horns to which said bumper system is attached.

* * * * *